(12) United States Patent
Zhou et al.

(10) Patent No.: US 12,367,841 B2
(45) Date of Patent: Jul. 22, 2025

(54) ELECTRONIC INK SCREEN AND DRIVING METHOD THEREOF

(71) Applicant: HKC CORPORATION LIMITED, Shenzhen (CN)

(72) Inventors: Mancheng Zhou, Chongqing (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 90 days.

(21) Appl. No.: 18/218,560

(22) Filed: Jul. 5, 2023

(65) Prior Publication Data

US 2024/0233661 A1    Jul. 11, 2024

(30) Foreign Application Priority Data

Jan. 5, 2023    (CN) .......................... 202310012762.2

(51) Int. Cl.
*G09G 3/34* (2006.01)
*G09G 3/20* (2006.01)

(52) U.S. Cl.
CPC ............ *G09G 3/344* (2013.01); *G09G 3/2007* (2013.01); *G09G 2320/0257* (2013.01); *G09G 2380/14* (2013.01)

(58) Field of Classification Search
CPC ................. G09G 3/344; G09G 3/2007; G09G 2320/0257; G09G 2380/14
See application file for complete search history.

(56) References Cited

U.S. PATENT DOCUMENTS

| | | | |
|---|---|---|---|
| 2007/0126692 A1 | 6/2007 | Ito et al. | |
| 2007/0212022 A1 | 9/2007 | Zhou et al. | |
| 2007/0273637 A1 | 11/2007 | Zhou et al. | |
| 2011/0128267 A1* | 6/2011 | Hsu ....................... | G09G 3/344 345/211 |
| 2011/0157256 A1* | 6/2011 | Sakamoto .............. | G09G 3/344 345/214 |
| 2012/0242642 A1* | 9/2012 | Yamazaki .............. | G09G 3/344 345/212 |
| 2015/0317950 A1* | 11/2015 | Sakagami .............. | G09G 3/344 345/206 |

(Continued)

FOREIGN PATENT DOCUMENTS

| | | |
|---|---|---|
| CN | 1809861 A | 7/2006 |
| CN | 1813279 A | 8/2006 |

(Continued)

OTHER PUBLICATIONS

Yuanying Fu, the ISA written comments, Sep. 2023, CN.
Yuanying Fu, the International Search Report, Sep. 2023, CN.

*Primary Examiner* — Priyank J Shah

(57) ABSTRACT

An electronic ink screen and a driving method thereof are disclosed. The driving method includes: in an image of a current page, sequentially receiving by each pixel a first reset voltage and an image voltage; in an image of a next page, sequentially receiving by each pixel a second reset voltage and an image voltage of the next page. The first reset voltage is used to reset the grayscale of the pixel from an original grayscale to a black grayscale. The image voltages are used to raise the grayscale of the pixel from a white grayscale or black grayscale to a target grayscale. Then the pixel displays according to the image voltage.

3 Claims, 3 Drawing Sheets

(56) References Cited

U.S. PATENT DOCUMENTS

2016/0335956 A1 11/2016 Sprague et al.

FOREIGN PATENT DOCUMENTS

| | | | |
|---|---|---|---|
| CN | 1860515 | A | 11/2006 |
| CN | 1914553 | A | 2/2007 |
| CN | 1934612 | A | 3/2007 |
| CN | 102298243 | A | 12/2011 |
| CN | 102376262 | A | 3/2012 |
| CN | 107272297 | A | 10/2017 |
| CN | 114512105 | A | 5/2022 |
| CN | 115831068 | A | 3/2023 |
| JP | 2007127969 | A | 5/2007 |
| JP | 2011221343 | A | 11/2011 |
| JP | 2012078622 | A | 4/2012 |
| JP | 2012194344 | A | 10/2012 |
| JP | 2016009031 | A | 1/2016 |
| KR | 20080034533 | A | 4/2008 |
| KR | 20130068846 | A | 6/2013 |
| KR | 20130108024 | A | 10/2013 |
| WO | 2006016301 | A1 | 2/2006 |

\* cited by examiner

ELECTRONIC INK SCREEN AND DRIVING METHOD THEREOF

CROSS-REFERENCE TO RELATED APPLICATIONS

This application claims the priority and benefit of Chinese patent application number 2023100127622, titled "Electronic Ink Screen and Driving Method Thereof" and filed Jan. 5, 2023 with China National Intellectual Property Administration, the entire contents of which are incorporated herein by reference.

TECHNICAL FIELD

The present application relates to the field of display technology, and more particularly relates to an electronic ink screen and a driving method thereof.

BACKGROUND

The description provided in this section is intended for the mere purpose of providing background information related to the present application but doesn't necessarily constitute prior art.

E-ink screen is a brand-new display screen with the advantages of ultra-thin and -light, portable, rewritable, comfortable reading, and low power consumption. As a new display technology, electronic ink screen has spawned many innovative mobile applications, such as e-books, e-newspapers, and electronic display boards. The electronic ink screen itself does not emit light, but relies on external reflection to achieve the display effect. It has a paper-like appearance and experience, and so has an important position in the field of e-books.

A current electronic ink screen is composed of two substrates. A capsule layer composed of countless microcapsule structures is arranged between the two substrates. Each microcapsule is sealed with a plurality of positively charged black particles and a plurality of negatively charged white particles. Because particles of different colors move in different directions due to different applied electric fields, the particles of different colors are arranged in an orderly manner, so that the electronic ink screen presents a black and white visual effect.

However, due to the limitations of its physical characteristics, the electronic ink screen not only has a slow refresh rate, but also is prone to afterimages, which affects the reading experience.

SUMMARY

In view of the above, it is therefore a purpose of the present application to provide an electronic ink screen and a driving method thereof, so as to increase the refresh rate of the electronic ink screen, improve the afterimage phenomenon, and improve the reading experience.

The present application discloses a method for driving an electronic ink screen, including the following operations:
in an image of a current page, each pixel sequentially receiving a first reset voltage and an image voltage of the current page;
in an image of the next page, the pixel sequentially receiving a second reset voltage and an image voltage of a next page;
wherein the first reset voltage is used to reset the grayscale of the pixel from the original grayscale to a black grayscale, and the second reset voltage is used to reset the grayscale of the pixel from the original grayscale to a white grayscale, and the image voltage is used to increase the grayscale of the pixel from white grayscale or black grayscale to a target grayscale, and the pixel performs display according to the image voltage.

The present application discloses an electronic ink screen, including: a first substrate, a capsule layer and a second substrate. The capsule layer is disposed between the first substrate and the second substrate. The first substrate includes a first base and a first transparent electrode. The capsule layer includes a plurality of capsules. Each capsule is provided with a plurality of liquid charges. The plurality of liquid charges include a plurality of black positively charged particles and a plurality of white negatively charged particles. The second substrate includes a second base, a plurality of data lines, a plurality of scan lines, a plurality of pixel active switches and a plurality of pixel electrodes arranged on the second base. Two adjacent data lines cross over two adjacent scan lines to form a pixel. One pixel active switch and one pixel electrode are arranged in the region of one pixel. A control terminal of the pixel active switch is connected to the corresponding scan line. An input terminal of the pixel active switch is connected to the corresponding data line. An output terminal of the pixel active switch is connected to the pixel electrode. In the image voltage of a current page, the data line sequentially inputs a first reset voltage and an image voltage of the current page, and the pixel receives the first reset voltage and the image voltage of the current page in sequence. In the image of a next page, the data line inputs a second reset voltage and an image voltage of the next page in sequence. The first reset voltage is used to reset the grayscale of the pixel from the original grayscale to the black grayscale. The second reset voltage is used to reset the grayscale of the pixel from the original grayscale to the white grayscale. The image voltage is used to raise the grayscale of the pixel from white grayscale or black grayscale to the target grayscale. The pixel displays according to the image voltage.

This application adopts different reset methods on adjacent pages, that is, the current page adopts the reset method of turning all pixels black, and on the next page, it adopts the reset method of turning all pixels white. Firstly, it avoids irreversible damage to the structure of the capsule caused by long-term use of a single blackening or whitening reset method, and secondly, it avoids the solution of first resetting the current grayscale to pure black and then resetting to pure white, or first resetting to pure white and then resetting to pure black, and finally raising to the target grayscale in each page, which takes a very long time. Furthermore, this application adopts different reset methods in adjacent pages, and the effect of eliminating afterimages is consistent with the above-mentioned effect of first black, and then white, and finally to the target grayscale, but the time consumption is greatly shortened, so that the refresh time is greatly shortened. Compared with the direct refresh method or the above-mentioned indirect refresh method, the raise to the target grayscale is more accurate, the display effect is more abundant, and when adjacent pages are refreshed, afterimages can be eliminated, which greatly improves the reading experience of the E-ink screen.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
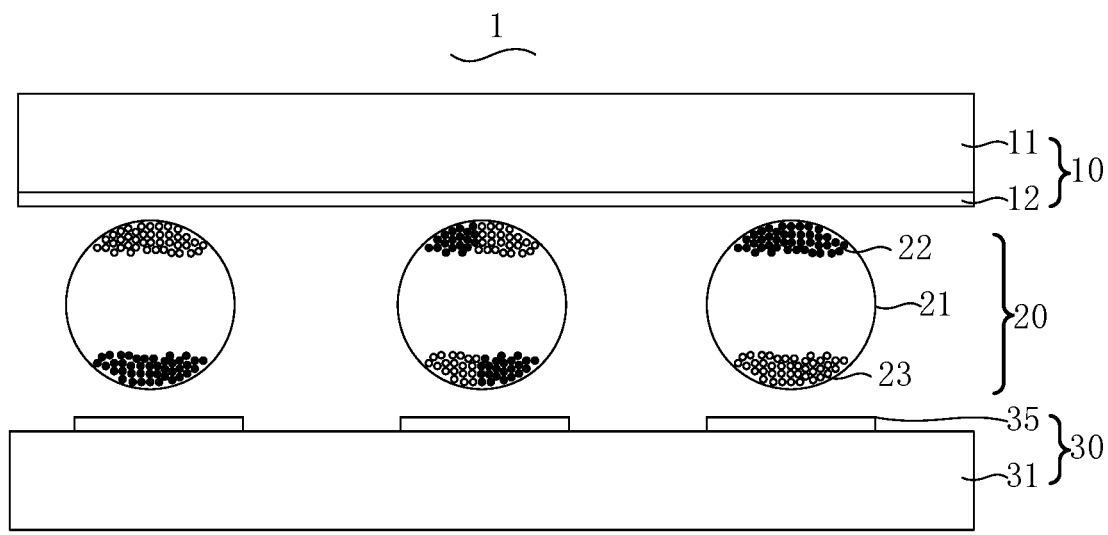
FIG. 1 is a schematic cross-sectional view of an electronic ink screen according to the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. In addition, terms "up", "down", "left", "right", "vertical", and "horizontal", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure. For those of ordinary skill in the art, the specific meanings of the above terms as used in the present application can be understood depending on specific contexts.

Hereinafter this application will be described in further detail with reference to the accompanying drawings and some optional embodiments.

Figure 2:
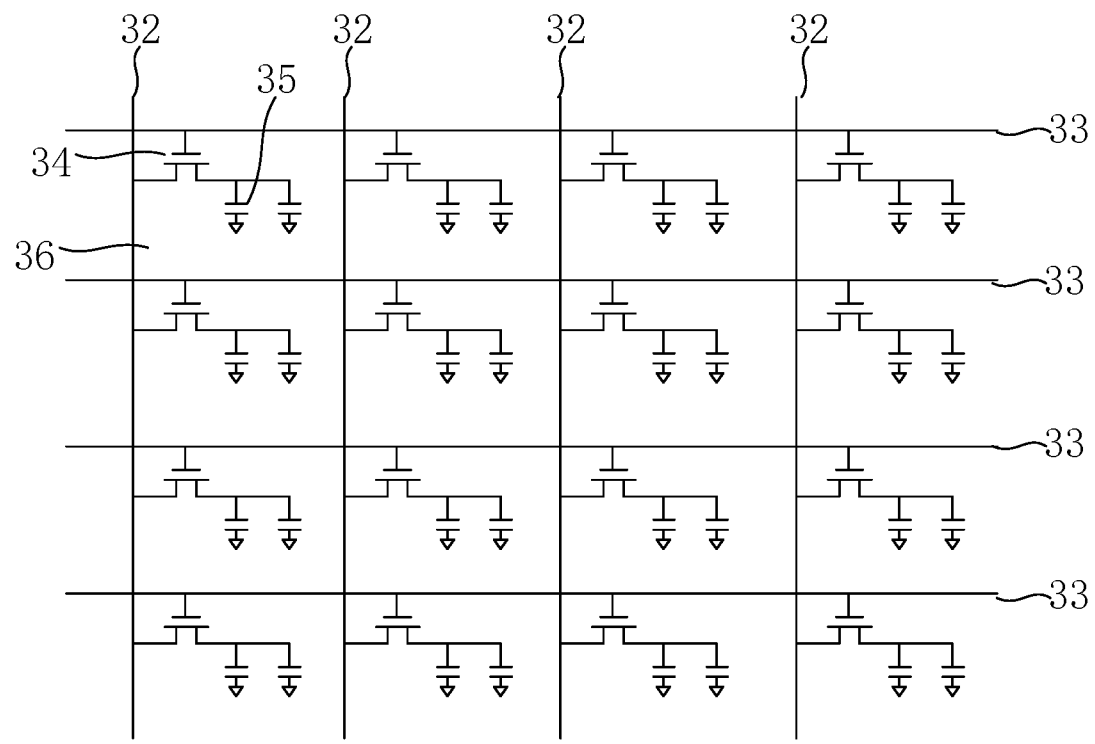
FIG. 2 is a driving schematic diagram of an electronic ink screen according to the present application.

FIG. 1 is a schematic cross-sectional view of an electronic ink screen according to the present application. FIG. 2 is a driving schematic diagram of an electronic ink screen according to the present application. Referring to FIGS. 1-2, the present application discloses an electronic ink screen 1. The electronic ink screen 1 includes: a first substrate 10, a capsule layer 20 and a second substrate 30. The pixel 36 layer is arranged between the first substrate 10 and the second substrate 30. The capsule layer 20 includes a plurality of capsules 21. Each capsule 21 includes a plurality of liquid charges. The plurality of liquid charges include a plurality of black positively charged particles 22 and a plurality of white negatively charged particles 23.

The first substrate 10 includes a first base 11 and a first transparent electrode 12. The second substrate 30 includes a second base 31, and a plurality of data lines 32, a plurality of scan lines 33, a plurality of pixels 36 active switches 34, and a plurality of pixel electrodes 35 that are arranged on the second base 31. The first transparent conductive layer and the pixel electrodes 35 are formed of indium tin oxide material, and the data lines 32 and the scan lines 33 are formed of a metal material(s). Two adjacent data lines 32 cross over two adjacent scan lines 33 to form a pixel 36. A pixel 36 active switch 34 and a pixel electrode 35 are arranged in the region of one pixel 36. A control terminal of the active switch 34 of the pixel 36 is connected to the corresponding scan line 33. An input terminal of the active switch 34 of the pixel 36 is connected to the corresponding data line 32. An output terminal of the active switch 34 of the pixel 36 is connected to the pixel electrode 35. In actual display, the pixel electrode 35 and the first transparent electrode 12 corresponding to the region of the pixel 36 jointly drive the positively and negatively charged particles in the corresponding capsule 21 in this region to move, so that a number of positive and negative charges in the capsule 21 are driven by the voltage difference generated between the pixel electrode 35 and the first transparent electrode 12, thereby displaying different grayscales. For example, the first transparent electrode 12 may be negative, and the pixel electrode 35 may be positive. At this time, the negative charges in the capsule 21 move to the side of the second substrate 30, and the positive charges in the capsule 21 move to the side of the first substrate 10, so that positive and negatively charged particles of different colors are arranged in an orderly manner, thereby presenting black and white visual effect. Furthermore, by adjusting the voltage difference between the first transparent electrode 12 and the corresponding pixel electrode 35, different grayscale displays can be realized, that is, different grayscales can be displayed.

In the image voltages of the current page, the data line 32 sequentially inputs a first reset voltage an an image voltage of the current page, and the pixel 36 receives the first reset voltage and the image voltage of the current page in sequence. In the image of the next page, the data line 32 sequentially inputs a second reset voltage and an image voltage of the next page. The first reset voltage is used to reset the grayscale of the pixel 36 from an original grayscale to a black grayscale. The second reset voltage is used to reset the grayscale of the pixel 36 from an original grayscale to a white grayscale. The image voltage is used to raise the grayscale of the pixel 36 from white grayscale or black grayscale to a target grayscale. The pixel 36 displays according to the image voltage.

It is worth mentioning that the first reset voltage is the data voltage for driving the capsule 21 when the image is black. Taking the electronic ink screen 1 with 16 grayscales as an example, grayscale 0 and grayscale 16 are all-black and all-white images respectively. That is, the first reset voltage corresponds to grayscale 0, and the second reset voltage corresponds to grayscale 16. In the current page, the charged particles in the capsule 21 are first controlled by the pixel electrode 35 of 0 grayscale, and after realizing the reset process from the current pixel 36 grayscale to 0 grayscale, the grayscale is raised to the target grayscale for display according to the image voltage of the current page. In the next page, the charged particles in the capsule 21 are first controlled by the pixel electrode 35 of 16 grayscales, after realizing the reset process from the grayscale of the current page to the 16 grayscale, the grayscale is raised to the target grayscale for display according to the image voltage of the next page. In the whole process from the current page to the next page, the full reset process of the charged particles in the capsule 21 from grayscale 0 to grayscale 16 is realized.

Figure 3:
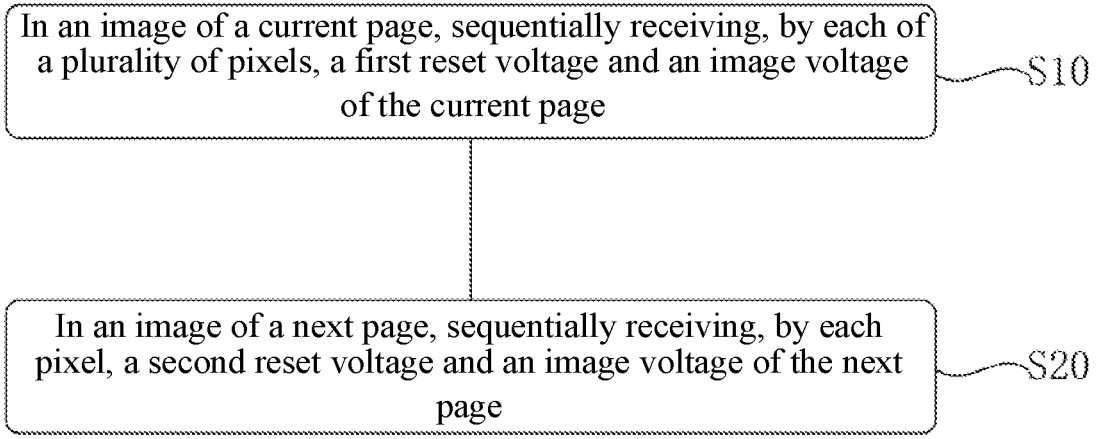
FIG. 3 is a flowchart of a driving method of an electronic ink screen according to the present application.

FIG. 3 is a flowchart of a driving method of an electronic ink screen according to the present application. As shown in FIG. 3, the present application discloses a method for driving an electronic ink screen 1, including the following operations:

S10: in an image of a current page, each pixel receiving a first reset voltage and an image voltage of the current page in sequence;

S20: in an image of a next page, the pixel sequentially receiving a second reset voltage and an image voltage of the next page;

This application adopts different reset methods on adjacent pages, that is, the current page adopts the reset method of turning all pixels 36 black, and on the next page, it adopts the reset method of turning all pixels 36 white. Firstly, it avoids irreversible damage to the structure of the capsule 21 caused by long-term use of a single blackening or whitening reset method, and secondly, it avoids the solution of first resetting the current grayscale to pure black and then resetting to pure white, or first resetting to pure white and then resetting to pure black, and finally raising to the target grayscale in each page, which takes a very long time. Furthermore, this application adopts different reset methods in adjacent pages, and the effect of eliminating afterimages is consistent with the above-mentioned effect of first black, and then white, and finally to the target grayscale, but the time consumption is greatly shortened, so that the refresh time is greatly shortened. Compared with the direct refresh method or the above-mentioned indirect refresh method, the raise to the target grayscale is more accurate, the display effect is more abundant, and when adjacent pages are refreshed, afterimages can be eliminated, which greatly improves the reading experience of the E-ink screen 1.

Figure 4:
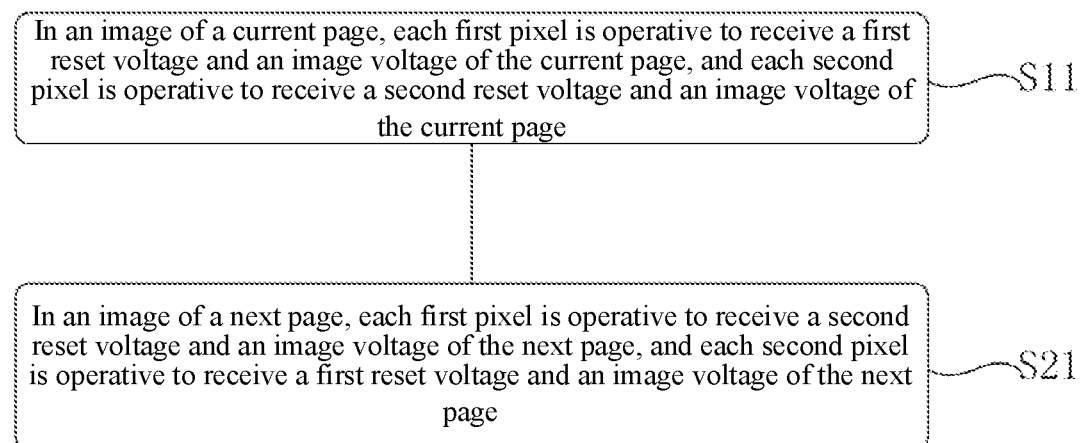
FIG. 4 is a flowchart of a second driving method of an electronic ink screen according to the present application.

Referring to FIG. 4, FIG. 4 is a flowchart of a second driving method of an electronic ink screen according to the present application, and the driving method includes the following operations:

S11: in the image of the current page, a first pixel receives a first reset voltage and an image voltage of the current page, and a second pixel receives a second reset voltage and an image voltage of the current page;

S21: in the image of the next page, the first pixel receives a second reset voltage and an image voltage of the next page, and the second pixel receives the first reset voltage and an image voltage of the next page.

Figure 5:
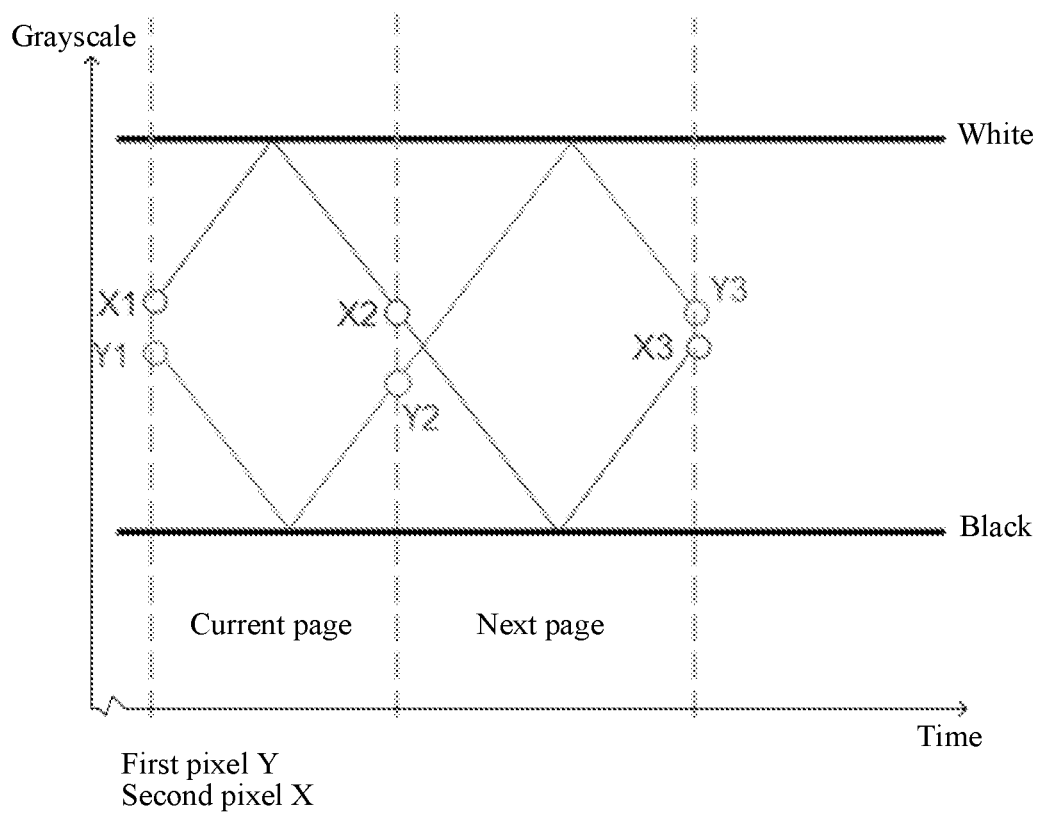
FIG. 5 is a schematic diagram of grayscale changes of a first pixel and a second pixel according to the present application.

Referring to FIG. 5, FIG. 5 is a schematic diagram of grayscale changes of a first pixel and a second pixel according to the present application, where the pixels include the first pixel and the second pixel, and the ordinate denotes the grayscale, and in the process of changing from black grayscale to white grayscale, the abscissa is time. For example, in the previous page, the grayscale of the first pixel is Y1, and the grayscale of the second pixel is X1. In the current page, the grayscale of the first pixel is Y2, and the grayscale of the second pixel is X2. In the next page, the grayscale of the first pixel is Y3 and the grayscale of the second pixel is X3. The first pixel and the second pixel only receive different reset voltages on the current page, that is, the first pixel receives the first reset voltage so that the first pixel is reset from the original grayscale to the black grayscale, and the second pixel receives the second reset voltage so that the second pixel is reset from the original grayscale to the white grayscale. In the current page, the first pixel and the second pixel are raised to the target grayscale according to the image voltage after being reset.

In this embodiment, the pixels are divided into a first pixel and second pixel, and the reset processes of the two pixels are reversed, where the first pixel is reset to a black image, and the second pixel is reset to a white image. This driving method effectively disarrange the refresh means of the entire screen, avoiding the problem of the whole screen being biased to white or black present in a single refresh method, that is, the uniformity is satisfied. Furthermore, there are both positive and negative voltages in the driving process required to effectively realize the DC balance of individual pixels in the time dimension (dynamically). This avoids irreversible damage to the electronic capsule 21 caused by applying an electric field in one direction for a long time or accumulating electric pulses in one direction for a long time.

In the present application, the arrangements of the first pixel and the second pixel can be listed as follows.

For example, a plurality of the first pixels are arranged in a row, a plurality of the second pixels are arranged in a row, and the plurality of rows of first pixels and the plurality of rows of second pixels are arranged alternately. Taking the odd-numbered columns as the first pixels and the even-numbered columns as the second pixels as an example, in the image of the current page, multiple scan lines 33 scan simultaneously, and multiple data lines 32 connected to the multiple columns of first pixels input the first reset voltage, and the multiple data lines 32 connected to multiple multiple columns of second pixels first input the second reset voltage. After the reset of the first pixel and the second pixel is completed, the scan lines 33 scan row by row, and the data lines 32 sequentially input the corresponding image voltages.

In this embodiment, the time of the current page can be divided into two periods of simultaneous scanning and progressive scanning by multiple scan lines 33, and in the simultaneous scanning period, the first pixel and the second pixel can be reset to a black image and a white image respectively. During the progressive scanning period, different image voltages are respectively provided to the first pixel and the second pixel at different positions, so as to display an image. In this embodiment, since the pixels corresponding to the same column are all the first pixels or the second pixels, the required reset voltages are the same, because it is only needed to scan at the same time.

For example, the plurality of first pixels and the plurality of second pixels are alternately arranged, and the number of the first pixels is equal to the number of the second pixels. In this embodiment, its driving method is consistent with that of the previous embodiment. For each first pixel and each second pixel, in the process of resetting to white picture or the black image, it is also needed to reset each pixel in a progressive scanning manner, and then provide the pixel with an image voltage. In this embodiment, for example, when the scan line 33 of the current row is turned on, the data line 32 of each column first provides the first reset voltage or the second reset voltage, and after the scan line 33 remains the ON-state for a preset time, the data line 32 provides the image voltage, so that the corresponding pixel electrode 35 receives the image voltage.

For example, the plurality of first pixels are arranged in a row, the plurality of second pixels are arranged in a row, and the plurality of rows of first pixels and the plurality of rows of second pixels are arranged alternately. Take the odd-numbered row of pixels as the first pixels and the even-numbered row of pixels as the second pixels as an example. Its driving method can also choose the method of first resetting and then inputting the image voltage in the progressive scanning in the previous embodiment. It is also possible to first turn on the scan lines 33 of odd rows, all the data lines 32 provide the first reset voltage, and then turn on the scan lines 33 of the even rows, and all the data lines 32 provide the second reset voltage, thereby realizing the reset of all pixels.

For this application, the reset frequency of first black and then white can be selected alternately one by one. For example, the first pixel receives the first reset voltage and the second reset voltage on adjacent pages respectively, and the second pixel receives the second reset voltage and the first reset voltage respectively on adjacent pages. Every two adjacent pages repeated sequentially. That is, in this embodiment, the first page is reset to a black image in odd pages, and is reset to a white screen in even pages. This refresh method effectively achieves both positive and negative voltages in the driving process required for the DC balance of an individual pixel in the time dimension (dynamically). Furthermore, it effectively disarranges the refresh method of the entire screen, avoiding the problem of the entire screen being biased to white or black in a single refresh method, that is, the uniformity is satisfied.

In another embodiment, the time of two adjacent pages is taken as the first period, and the time of the next two pages is taken as the second period, then the first pixel sequentially receives the first reset voltage and the second reset voltage during the first period and the second period respectively, and the second pixel sequentially receives the second reset voltage and the first reset voltage in the first period and the second period respectively. Every four adjacent pages are repeated sequentially. In order to weaken the human eye reaction, it is also possible to choose to refresh at intervals of two pages.

In another embodiment, the method of adding direct refresh on the basis of the above refresh method can also be considered. The way of direct refresh is to directly change from one grayscale to another grayscale. The advantage of this method is that the change path is short, the time is short, but the grayscale is not accurate, and the afterimage phenomenon is significant. For example, if the reset method is first-go-black on the first page, the reset method is first-go-white on the second page, and the method of direct refresh can be selected for the third page. Repeating the refreshing methods of the above three pages in turn not only makes up for the problems of inaccurate grayscales and afterimage caused by direct refreshing, but also have the advantages of short refreshing path and fast response. The switching method of more than two page can be reset by first-go-black on the first page, direct refresh on the second page, first-go-white reset on the third page, and direct refresh on the fourth page. The above four pages are repeated in order. Of course, the refresh methods can also form multiple embodiments, which will not be repeated here.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, and shall all be regarded as falling in the scope of protection of this application.

What is claimed is:

1. An electronic ink screen, comprising: a first substrate, a capsule layer, and a second substrate, wherein the capsule layer is arranged between the first substrate and the second substrate;
   wherein the first substrate comprises a first base and a first transparent electrode;
   wherein the capsule layer comprises a plurality of capsules, wherein each capsule comprises a plurality of liquid charges, and wherein the plurality of liquid charges comprise a plurality of black positively charged particles and a plurality of white negatively charged particles;
   wherein the second substrate comprises a second base, a plurality of data lines, a plurality of scan lines, a plurality of pixel active switches, and a plurality of pixel electrodes that are arranged on the second base;
   wherein every two adjacent data lines cross over every two adjacent scan lines to form a pixel, wherein one pixel active switch and one pixel electrode is located within a region of one respective pixel; wherein a control terminal of each pixel active switch is connected to the respective scan line, an input terminal of the pixel active switch is connected to the respective data line, and an output terminal of the pixel active switch is connected to the respective pixel electrode;
   wherein in an image of a current page, each data line is operative to sequentially input a first reset voltage and an image voltage of the current page, and each respective pixel is operative to receive the first reset voltage and the image voltage of the current page in sequence; and wherein in an image of a next page, each data line is operative to sequentially input a second reset voltage and an image voltage of the next page;
   wherein the first reset voltage is used to reset a grayscale of each pixel from an original grayscale to a black grayscale, and the second reset voltage is used to reset the grayscale of each pixel from an original grayscale to a white grayscale, wherein the image voltages are used to raise the grayscale of each pixel from the white grayscale or black grayscale to a target grayscale, and the pixel is operative to perform display according to the image voltage;
   wherein the plurality of pixels comprise a first pixel and a second pixel;
   wherein in the image of the current page, each first pixel is operative to receive the first reset voltage and the image voltage of the current page, and each second pixel is operative to receive the second reset voltage and the image voltage of the current page;
   wherein in the image of the next page, each first pixel is operative to receive the second reset voltage and the image voltage of the next page, and each second pixel is operative to receive the first reset voltage and the image voltage of the next page;
   wherein the plurality of first pixels are arranged in a column, the plurality of second pixels are arranged in a column, and wherein the plurality of columns of first pixels and the plurality of columns of second pixels are arranged alternately;
   wherein in the image of the current page, the plurality of scan lines are scanned simultaneously, and wherein the plurality of data lines connected to the plurality of columns of first pixels input the first reset voltage, and the plurality of data lines connected to the plurality of columns of second pixels input the second reset voltage; and wherein after the reset of the plurality of first pixels and the plurality of second pixels is completed, the plurality of scan lines are operative to be scanned row by row, and the plurality of data lines are operative to input the corresponding image voltages sequentially.

2. The electronic ink screen as recited in claim 1, wherein the plurality of first pixels and the plurality of second pixels are alternately arranged, and wherein a number of the plurality of first pixels is equal to a number of the plurality of second pixels.

3. The electronic ink screen as recited in claim 1, wherein
wherein each first pixel is configured to receive only one first reset voltage or one second reset voltage in a same page; each second pixel is configured to receive only one first reset voltage or one second reset voltage.

\* \* \* \* \*